UNITED STATES PATENT OFFICE.

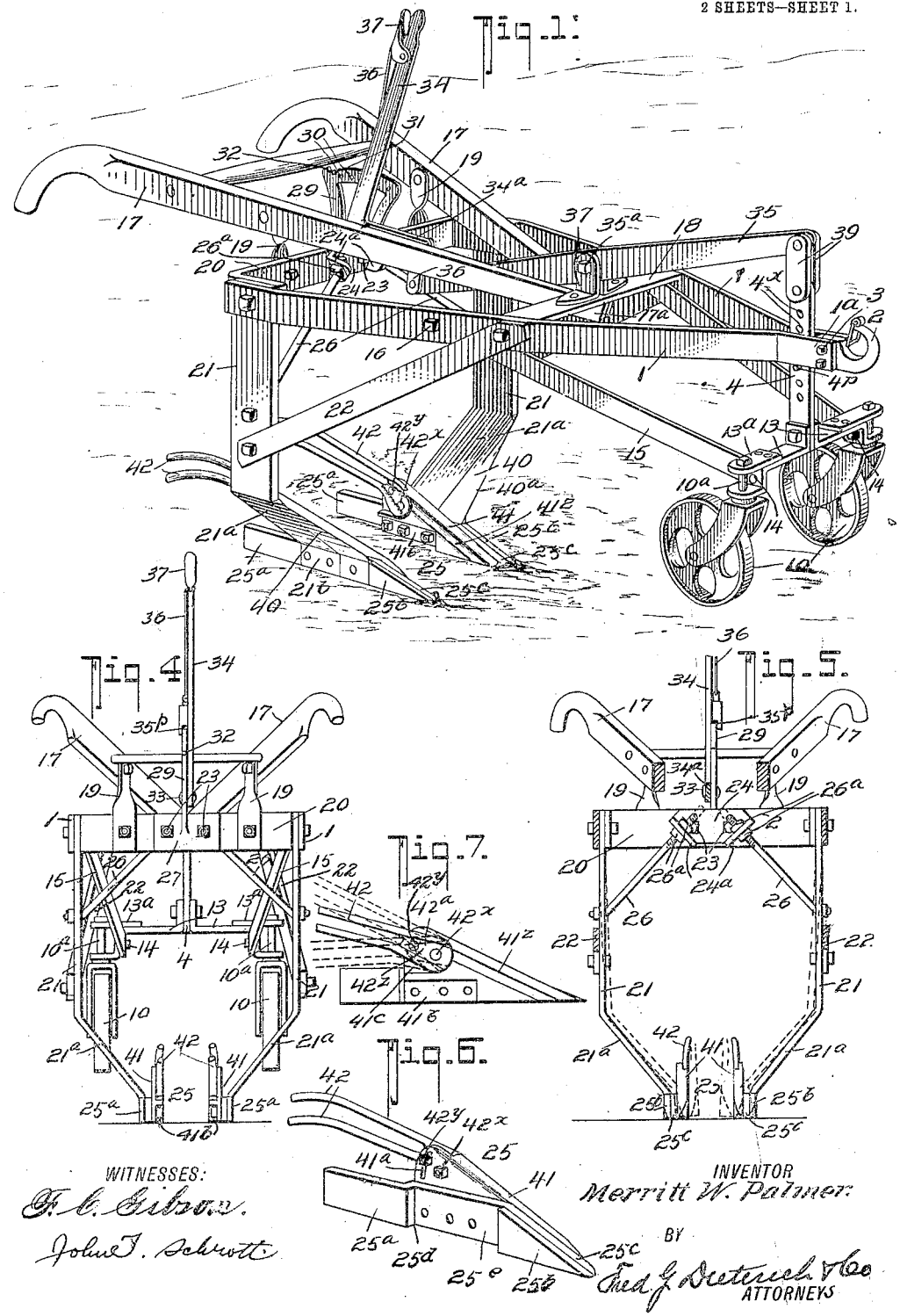

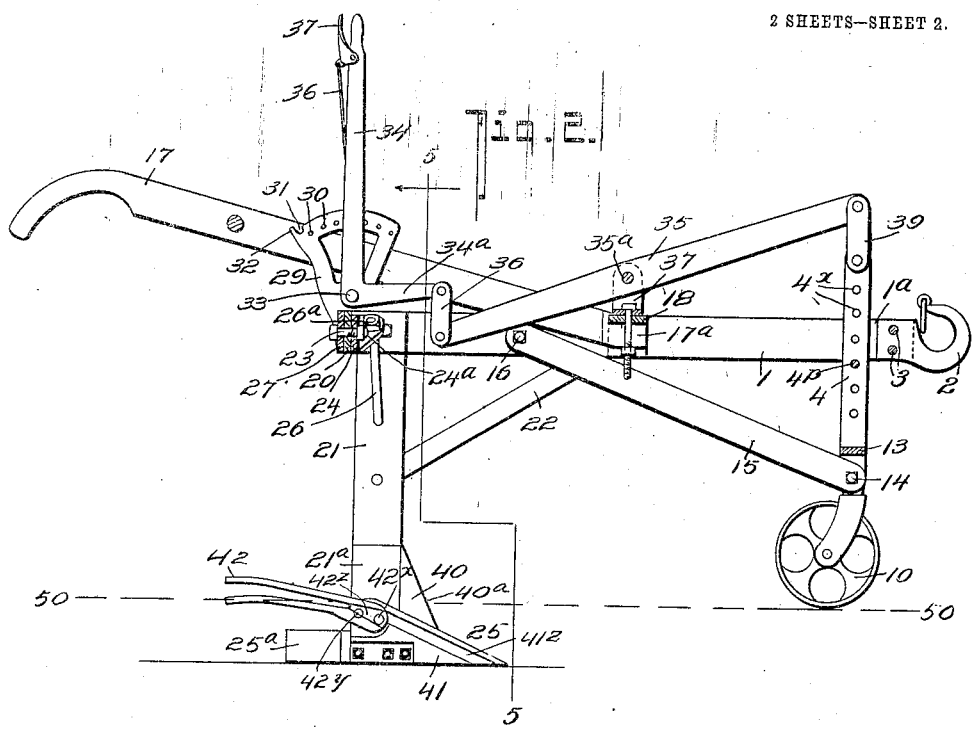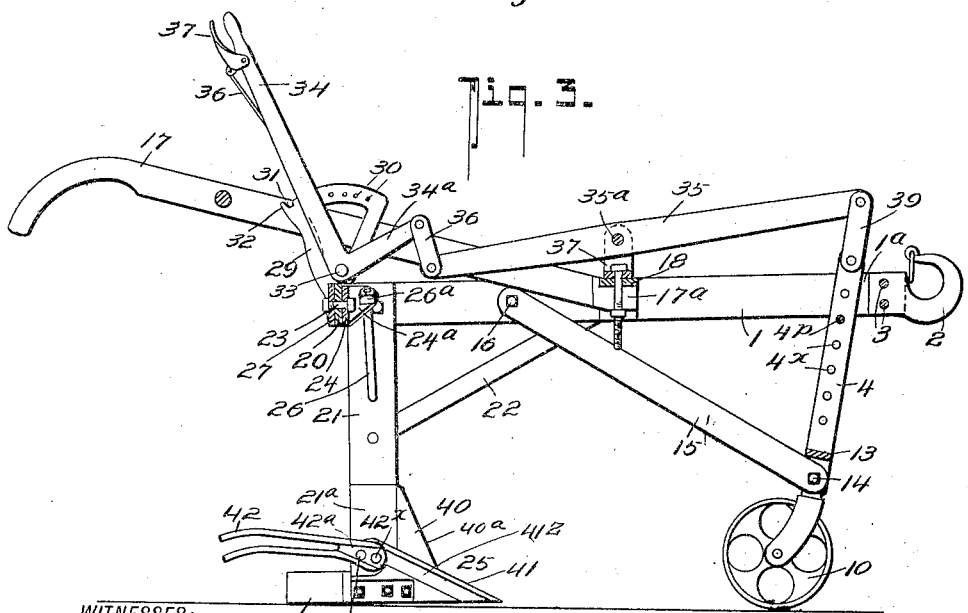

MERRITT WESLEY PALMER, OF HAMILTON, MICHIGAN.

BEET-PULLER.

No. 829,285.     Specification of Letters Patent.     Patented Aug. 21, 1906.

Application filed January 8, 1906. Serial No. 295,120.

*To all whom it may concern:*

Be it known that I, MERRITT WESLEY PALMER, residing at Hamilton, in the county of Allegan and State of Michigan, have invented certain new and useful Improvements in Beet-Pullers, of which the following is a specification.

My present invention, which relates to that type of beet plows or pullers having runners adapted to enter the soil under and to straddle the beet and pull it bodily upward upon lifter-arms, more particularly seeks to improve a construction of beet puller or plow disclosed in my Patents No. 699,561, dated May 6, 1902, and No. 772,819, dated October 18, 1904, whereby to render the operation of the puller or plow more effective and positive, the manufacture of the same more economical, and the coöperative arrangement of the several parts more durable and compact.

My present invention is more in the nature of an improvement on my second patent above referred to and comprises a machine of substantially the same form and contour of my patent last referred to; and my present invention involves an improved construction of machine in which means are provided for shifting the wheels with relation to the runners, so that the puller can be readily handled and when not in use can be directly conveyed from place to place without the runners entering the ground.

My invention also embodies gage-wheels having a swivel-mounting to enable the machine to be turned around without tipping or lifting the puller around; and my invention also includes an improved construction of runner or plow, together with other certain novel details of construction, combination, and arrangement of parts, all of which will be first described in detail and then be specifically pointed out in the appended claims, reference being had to the accompanying drawings, in which—

Figure 1 is a perspective view of my invention, showing the same ready for use and the runners just beginning to enter the ground. Fig. 2 is a vertical longitudinal section of my invention, showing the position of the parts when the runners are in the ground and serving to pull the beets. Fig. 3 is a view similar to Fig. 2, showing the position of the parts when the runners are out of the ground and the machine is ready to be turned or pulled along over the ground. Fig. 4 is a rear elevation of my apparatus. Fig. 5 is a cross-section on the line 5 5 of Fig. 2. Fig. 6 is a detail view of one of the runners or shoes. Fig. 7 is another detail view of one of the runners or shoes.

Referring now to the accompanying drawings, in which like numerals of reference indicate like parts in all of the figures, the horizontal or draft frame is substantially V-shaped in plan view and consists of the vertically-set side bars 1 1, whose front ends lap, as at 1ᵃ, and are spaced apart by the pull-clevis or draft device 2, as shown, which clevis 2 is secured in position by suitable bolts 3, as shown. The ends 1ᵃ 1ᵃ of the bars 1 1 are also sufficiently spaced apart to permit passage of the vertical supporting-standard 4 of the carriage, which includes the gage-wheels 10 10, as shown. The support 4 is vertically held and is secured to the horizontally - projecting bracket members 13 13, which terminate in bearings 13ᵃ to receive the swivel-shaft 10ᵃ of the wheels 10, the wheels 10 having a swivel-mounting similar to the ordinary "caster-wheels," so that the machine can be readily manipulated, as will be hereinafter more fully explained.

Pivotally secured by bolts 14 to the bracket 13ᵃ are a pair of rearwardly-projecting brace-bars 15, whose other ends are pivotally secured by bolts 16 to the bars 1, as shown.

The handles 17 have their front ends 17ᵃ adjustably bolted to the cross-brace 18, that is secured to the bars 1 1. The handles 17 are also pivotally secured to the brackets 19, secured to the rear brace-bar 20 of the frame of the machine.

Secured between the brace-bar 20 and the bars 1 1 are downwardly-projecting standards 21, which are inwardly bent, as at 21ᵃ, near their lower ends and have their extreme lower ends 21ᵇ bent to be secured to the plows or shoes 25, hereinafter again referred to. The standards 21 are braced by suitable brace-bars 22, that connect the standards with the bars 1 1, as shown.

Secured to the rear brace-bar 20 by bolts 23 is a plate 24, which has the forwardly-projecting ears 24ᵃ 24ᵃ apertured to permit passage of the adjusting-rods 26, that are secured at one end to the standards 21 and have their other ends threaded to receive the adjusting-nuts 26ᵃ 26ᵃ, by means of which the standards 21 can be drawn closer together or permitted to spring farther apart, as clearly shown in dotted and full lines in Fig. 5, thus enabling the shoes 25 to be set at a greater or less distance apart as circumstances may make advisable.

Secured to the rear of the bar 20 by an ear or plate 27 and bolts 23 is a segmental rack-plate 29, having a plurality of pin-receiving apertures 30, and a notch 31, as shown, a stop 32 being provided at the rear of the projecting portion of the plate, as shown, for a purpose presently understood. Pivotally secured at 33 to the member 30 is a lever 34, having a pawl 35$^p$, and an operating-rod and hand-engaging member 36 37, as shown, whereby the lever 34 can be locked in any position with respect to the member 29 for a purpose presently understood.

The lever 34 is in the nature of a bell-crank lever, with its short arm 34$^a$ extending forwardly and connecting to a walking-beam 35 through the medium of the link 36, that is pivotally connected to the arm 34$^a$ and to one end of the beam 35. The beam 35 is pivotally mounted at 35$^a$ on a bracket 37, secured to the cross-bar 18, and it has its other end connected with the standard 4 through links 39, that are pivotally connected to the standard 4 and to the beam 35, as shown.

The standard 4 has a series of pin-receiving apertures 4$^x$, through which a suitable pin 4$^p$ may be passed to form a stop for the draft-frame when the parts have been adjusted through the medium of the shifting-lever 34.

The plows 25 each comprise a long bar 25$^a$, of steel or other suitable material, having a flat piece 25$^b$ welded to the point 25$^c$, as shown, the thickness of the plate 25$^b$ being the same as the cutter-blade 40, which is secured to the plow and extends up parallel with the portion 21$^a$ of the standards 21, and the cutter-blade has a shearing edge 40$^a$, as shown. The back end of the plate 25$^a$ is bent, as at 25$^d$, to form with the plate 25$^b$ a groove 25$^e$ to receive the cutter-blade or shearing-knife and the standard 21, as clearly shown in Figs. 1 and 6 of the drawings.

Bolted or otherwise secured to the plate 25$^a$ by the same bolts which secure the standards 21 and the cutter-blades 40 are plates 41, that carry the lifting-rods 42, and the plates 41 are slotted, as at 41$^a$, and formed with countersunk portions 41$^b$ and 41$^c$, (see Figs. 1 and 7,) one of which, 41$^b$, receives the nuts of the securing-bolts, while the other, 41$^c$, receives the head 42$^a$ of the lifting-rods 42, which head 42$^a$ is pivotally secured to the plate 41 by a bolt 42$^x$, and is also secured by a bolt 42$^y$, that passes through the slot 41$^a$, so that the lifter-rods 42 may be adjusted at different angles to the horizontal for a purpose presently to be understood.

The plate 41 has its exposed face provided with a groove 41$^z$, that runs from the point upwardly toward the head 42$^a$ of the lifter-rods 42 and merges with the groove 42$^z$ on the head 42$^a$, as shown. The lifter-bars 42 are arranged in pairs and spaced apart, so that the spacing between the bars is in alinement with the groove 42$^z$ for a purpose now to be explained.

The lifter-rods 42 can be adjusted at various angles, and as the plows or runners enter the ground on each side of the beet the soil will pack in the grooves 41$^z$ 42$^z$ and between the rods 42 and be drawn up in a direction to correspond to the said grooves and lifter-rods, the grooves and spaces between the lifter-rods and the beet and packed soil as it passes up along the groove having a connection with each other in the nature of a tongue-and-groove engagement. By setting the rods at their greatest elevation the beet will be entirely carried out of the ground, thus enabling my puller to be used with greater advantage than those now in common use.

By reason of the swivel-gage wheels 10 I am enabled to move the apparatus in various directions and conveniently handle the same, and by pulling the lever 34 back into engagement with the stud 32 the parts will assume the position shown in Fig. 3, when the machine can be drawn over the surface of the ground without the plows 25 entering the soil.

When the apparatus is in operation, the parts are in the position shown in Fig. 2, the broken line 50 representing the surface level of the ground.

When the puller is in operation, the draft-frame works up and down on the gage-wheel standard, when the parts are adjusted through the lever 34 and the apertures 4$^x$ in the gage-wheel standard 4 to receive a pin or bolt, which is inserted at various points to regulate the depth it is desired for the runners or plows to enter the ground, the draft-frame sliding down the gage-wheel standard until it strikes the pin.

When the lever 34 is adapted to have its catch enter the notch 31, then the plow-points will be directed upwardly, as shown in Fig. 3, so that they will not enter the ground, the points being higher than the heels.

From the foregoing description, taken in connection with the accompanying drawings, it is thought the complete construction, operation, and many advantages of my invention will be readily understood by those skilled in the art to which it appertains, and I desire it understood that in practice when the plows are formed of soft metal they may be tipped by steel points, as shown in my prior patent last referred to.

What I claim is—

1. In a beet-puller of the character described, the combination with the draft-frame, a pair of separated plow members pendent from the rear end of the frame, and plows mounted one on the lower end of each standard, a cutting member secured to the outer face of each plow and projected in the same plane as the standards, said plows comprising a main plate having a bent portion to form a shoulder, a supplemental plate secured to said main plate, said supplemental plate having its exposed face provided with a groove, lifter-rods pivotally secured to said supplemental plate, and means for holding said lifter-rods in various adjusted positions, substantially as shown and described.

2. In a beet-pulling machine, the combination with a draft-frame and the standards, of plows secured to said standards, said plows comprising a main plate having a penetrating point, and a shoulder to form a groove to receive the ends of the standards, shearing-knives also held in said grooves and abutting said standards, a supplemental plate secured to said main plate and having a groove on its exposed face, a pair of lifter-rods for each plow, said lifter-rods being spaced apart and having a head, means for pivotally mounting the head to the supplemental plate, and means coöperating with the head and the supplemental plate for holding the lifter-rods at various angles to the horizontal, substantially as shown and described.

3. In a beet-pulling machine, the combination with a draft-frame and the standards, of plows secured to said standards, said plows comprising a main plate having a penetrating point, and a shoulder to form a groove to receive the ends of the standards, shearing-knives also held in said grooves and abutting said standards, a supplemental plate secured to said main plate and having a groove on its exposed face, a pair of lifter-rods for each plow, said lifter-rods being spaced apart and having a head, means for pivotally mounting the head to the supplemental plate, means coöperating with the head and the supplemental plate for holding the lifter-rods at various angles to the horizontal, said head having a groove merging with the groove in the supplemental plate and with the space between the lifter-rods, substantially as shown and described.

4. In a beet-pulling machine, the combination with a plow comprising a main plate terminating in a point and formed with shoulders to produce a groove, by means of which the plow can be secured to the frame of a beet-pulling machine, of a supplemental plate adapted to be secured to said main plate, and a pair of lifter-rods adjustably secured to said supplemental plate, substantially as shown and described.

5. In a beet-pulling machine, the combination with a plow comprising a main plate terminating in a point and formed with shoulders to produce a groove by means of which the plow can be secured to the frame of a beet-pulling machine, of a supplemental plate adapted to be secured to said main plate, a pair of lifter-rods adjustably secured to said supplemental plate, said supplemental plate having a groove on its exposed face for coöperating with the lifter-rods, substantially as shown and described.

6. In a machine of the class described, a plow comprising a main plate having a shoulder, a supplemental plate secured to the main plate and having its exposed face provided with a groove, lifter-rods adjustably secured to the supplemental plate, and means for holding said lifter-rods in various adjusted positions, substantially as shown and described.

MERRITT WESLEY PALMER.

Witnesses:
  EVA KLINKERS,
  BENJAMIN LA BARGE.